(12) United States Patent
Sinha et al.

(10) Patent No.: US 11,805,423 B2
(45) Date of Patent: *Oct. 31, 2023

(54) MECHANISM TO DETERMINE CELLULAR SIGNAL REPUTATION OF A LOCATION AND INTELLIGENTLY MANAGE LACK OF CONNECTIVITY

(71) Applicant: McAfee, LLC, Santa Clara, CA (US)

(72) Inventors: Raja Sinha, Shanthinagar (IN); Dattatraya Kulkarni, Bangalore (IN); Srikanth Nalluri, Bangalore (IN); Anjan Kumar Nayak, Bengaluru (IN); Tirumaleswar Reddy Konda, Bangalore (IN); Susmita Nayak, Fremont, CA (US); Purushothaman B, Bengaluru (IN); Harsha R. Joshi, Bangalore (IN)

(73) Assignee: McAfee, LLC, San Jose, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/510,313

(22) Filed: Oct. 25, 2021

(65) Prior Publication Data
US 2022/0225113 A1     Jul. 14, 2022

Related U.S. Application Data

(63) Continuation of application No. 16/147,322, filed on Sep. 28, 2018, now Pat. No. 11,166,170.

(51) Int. Cl.
*H04W 16/18* (2009.01)
*H04W 4/021* (2018.01)
(Continued)

(52) U.S. Cl.
CPC ......... *H04W 16/18* (2013.01); *H04W 4/021* (2013.01); *H04W 4/024* (2018.02); *H04W 4/025* (2013.01); *H04W 24/08* (2013.01)

(58) Field of Classification Search
None
See application file for complete search history.

(56) References Cited

U.S. PATENT DOCUMENTS

| 6,721,572 B1 | 4/2004 | Smith et al. |
| 7,603,115 B2 | 10/2009 | Banavar et al. |
| 9,043,135 B2 | 5/2015 | Dave et al. |

(Continued)

FOREIGN PATENT DOCUMENTS

KR        101669540        10/2016

OTHER PUBLICATIONS

International Searching Authority, "International Search Report and Written Opinion," issued in connection with application No. PCT/US2019/052975, dated Jan. 10, 2020, 11 pages.

(Continued)

*Primary Examiner* — Saad Khawar
(74) *Attorney, Agent, or Firm* — HANLEY, FLIGHT & ZIMMERMAN, LLC

(57) ABSTRACT

A technique for collecting and using signal reputation data, comprising obtaining a plurality of signal reputation data corresponding to a plurality of locations, categorizing the signal reputation data into groups, calculating signal circles for at least some of the groups based on a representative signal value for the corresponding group, calculating a signal reputation score for each signal circle, determining a best signal circle for a user mobile device within a predetermined distance of dead zones, and sending the best signal circle to the user mobile device based at least in part on the signal reputation score and a location of the user mobile device. In some embodiments, the technique may include some but not all of these actions and additional actions, such as suspending obtaining signal reputation data based on battery status.

21 Claims, 14 Drawing Sheets

(51) Int. Cl.
 *H04W 4/024* (2018.01)
 *H04W 4/02* (2018.01)
 *H04W 24/08* (2009.01)

(56) References Cited

U.S. PATENT DOCUMENTS

| | | | |
|---|---|---|---|
| 9,338,747 B1 * | 5/2016 | Parthasarathy | H04W 28/12 |
| 9,453,902 B2 | 9/2016 | Pan et al. | |
| 11,166,170 B2 * | 11/2021 | Sinha | H04W 16/18 |
| 2006/0135180 A1 | 6/2006 | Jakel et al. | |
| 2008/0009324 A1 | 1/2008 | Patel | |
| 2010/0250269 A1 | 9/2010 | Rappaport | |
| 2012/0131212 A1 | 5/2012 | Tang et al. | |
| 2013/0024107 A1 | 1/2013 | Xie et al. | |
| 2014/0094187 A1 | 4/2014 | LaMarca et al. | |
| 2014/0200038 A1 * | 7/2014 | Rao | H04W 4/18 455/457 |
| 2015/0142590 A1 | 5/2015 | Gray et al. | |
| 2015/0257014 A1 | 9/2015 | Ahmed et al. | |
| 2016/0076895 A1 | 3/2016 | Dave et al. | |
| 2017/0215093 A1 * | 7/2017 | Zhang | H04W 24/02 |
| 2018/0049001 A1 | 2/2018 | Volozh et al. | |
| 2018/0206136 A1 | 7/2018 | Chow et al. | |
| 2019/0053189 A1 | 2/2019 | Ramamurthy | |

OTHER PUBLICATIONS

United States Patent and Trademark Office, "Non-Final Office Action," issued in connection with U.S. Appl. No. 16/147,322, dated Sep. 12, 2019, 24 pages.

United States Patent and Trademark Office, "Final Office Action," issued in connection with U.S. Appl. No. 16/147,322, dated Feb. 10, 2020, 28 pages.

United States Patent and Trademark Office, "Non-Final Office Action," issued in connection with U.S. Appl. No. 16/147,322, dated Jan. 12, 2021, 31 pages.

United States Patent and Trademark Office, "Notice of Allowance and Fee(s) Due," issued in connection with U.S. Appl. No. 16/147,322, dated Jun. 30, 2021, 9 pages.

International Searching Authority, "International Preliminary Report on Patentability," issued in connection with Application No. PCT/US2019/052975, dated Mar. 23, 2021, 7 pages.

European Patent Office, "European Search Report," issued in connection with Application No. 19865701.7, dated May 12, 2022, 10 pages.

European Patent Office, "Communication pursuant to Rules 70(2) and 70a(2) EPC," issued in connection with Application No. 19865701.7, dated Jun. 1, 2022, 1 page.

* cited by examiner

MECHANISM TO DETERMINE CELLULAR SIGNAL REPUTATION OF A LOCATION AND INTELLIGENTLY MANAGE LACK OF CONNECTIVITY

RELATED APPLICATION

This patent claims the benefit of U.S. Non-Provisional patent application Ser. No. 16/147,322, filed Sep. 28, 2018, entitled "MECHANISM TO DETERMINE CELLULAR SIGNAL REPUTATION OF A LOCATION AND INTELLIGENTLY MANAGE LACK OF CONNECTIVITY" and PCT Application Serial No. PCT/US19/52975, filed on Sep. 25, 2019, entitled "A MECHANISM TO DETERMINE CELLULAR SIGNAL REPUTATION OF A LOCATION AND INTELLIGENTLY MANAGE LACK OF CONNECTIVITY." U.S. Non-Provisional patent application Ser. No. 16/147,322 and PCT Application Serial No. PCT/US19/52975 are hereby incorporated herein by reference in their entirety.

TECHNICAL FIELD

Embodiments described herein generally relate to a mechanism to determine a cellular signal reputation of a location and intelligently manage lack of connectivity. In particular, a method and system to determine signal health scores and directions to areas of higher signal health scores are disclosed.

BACKGROUND ART

Applications and services on devices from wearables to connected cars rely on connectivity to deliver value to the user. Many services require a minimum signal strength and bandwidth to function. Loss of service may have serious consequences, especially when the user is attempting to access critical services such as emergency services, roadside assistance, and directions. Signal dead zones force users to blindly search for areas of better signal quality meeting the requirements of the desired application or service. A way to predict signal dead zones, determine areas of strong signal, guide users from signal dead zones to areas of strong signal, and recommend preventive and remedial actions would be desirable.

DESCRIPTION OF EMBODIMENTS

In the following description, for purposes of explanation, numerous specific details are set forth in order to provide a thorough understanding of the inventions. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the inventions, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

As used herein, the term "database" refers to any collection of data that can be searched to find an existing entry. Any desired form of database can be used, including simple text files or more structured forms of data storage, and no data structure or format is implied by the use of the term.

One or more embodiments provide a procedure for determining signal reputation of a location and intelligently managing lack of connectivity, including crowd-sourcing signal reputation data, determining signal circles and associated signal reputation scores, predicting dead zones, determining a best signal circle, and providing recommendations to a user mobile device. In some embodiments, the data collection procedure and recommendations to user mobile devices prioritize battery conservation to extend user mobile device life. Predicting dead zones and determining a best signal circle reduces time spent without connectivity by allowing a user to choose alternate routes with better signal reputations and quickly regaining signal where dead zones are unavoidable.

Figure 1:
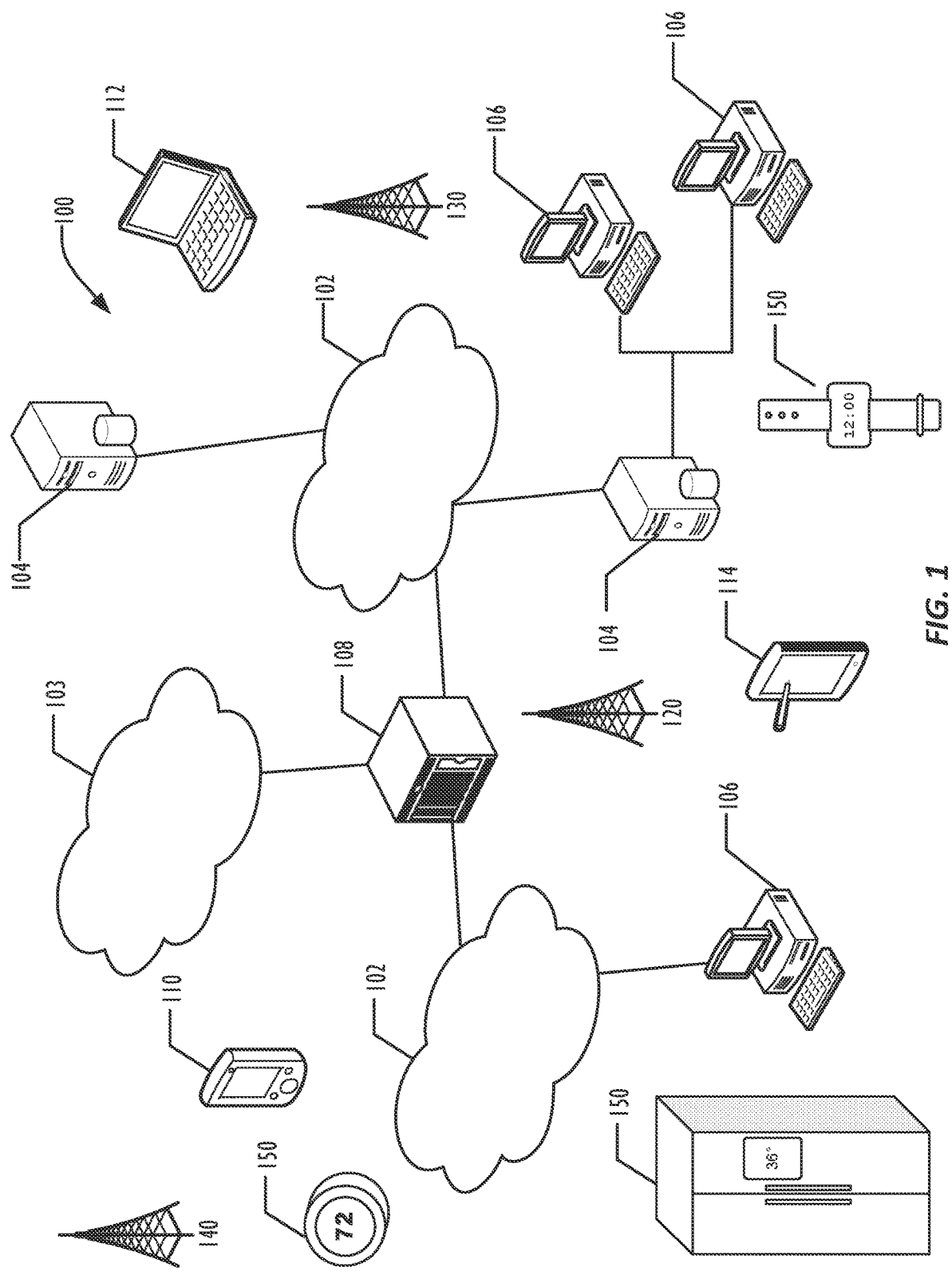
FIG. 1 is a diagram illustrating a network of programmable devices according to one or more embodiments.

Referring to FIG. 1, an example infrastructure 100 in which embodiments may be implemented is illustrated schematically. Infrastructure 100 contains computer networks 102. Computer networks 102 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things devices (microcontrollers, embedded systems, industrial control computing modules, thermostat, refrigerator, etc.) 150. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, it is most commonly implemented in a firewall or intrusion protection system in a gateway or router.

Figure 2:
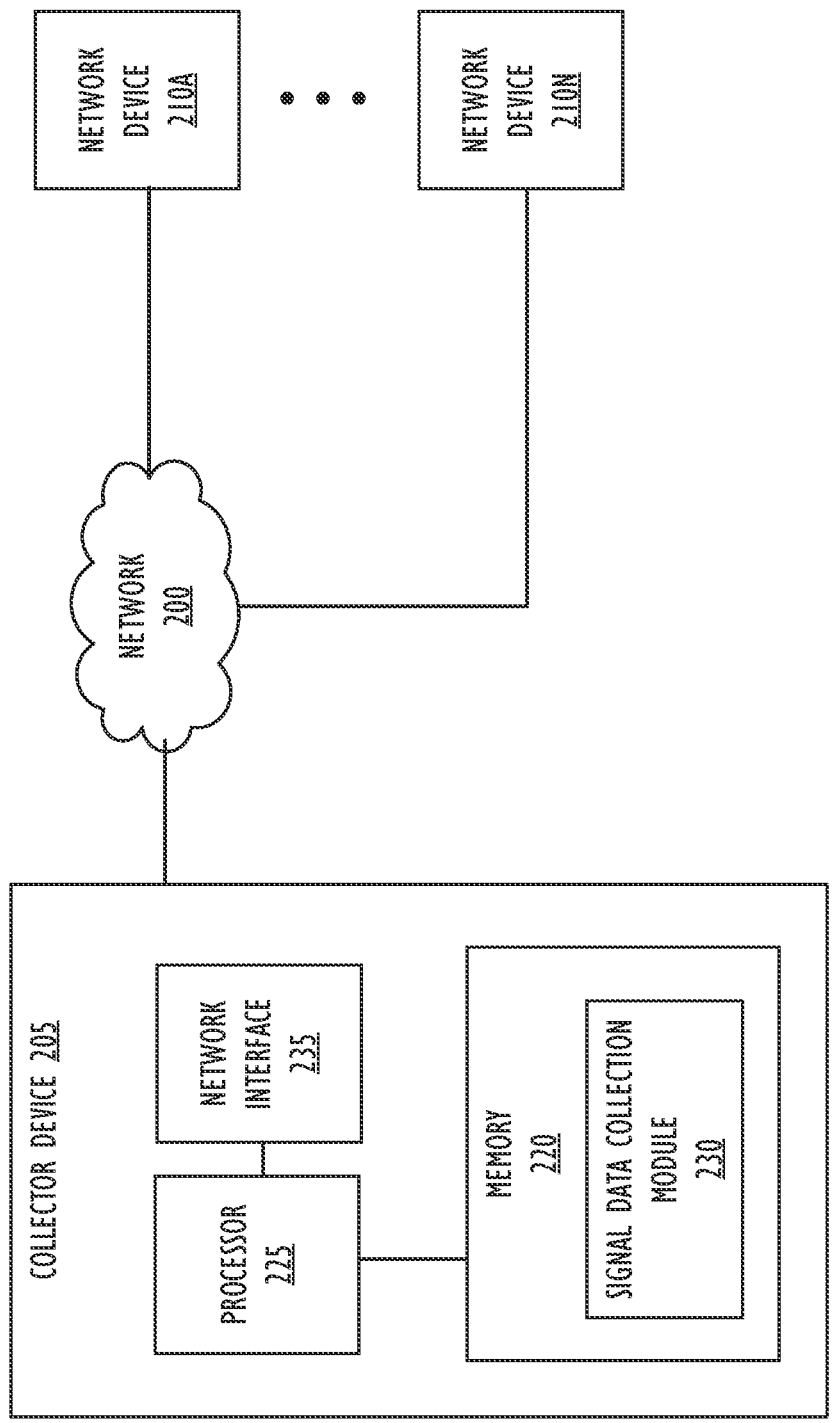
FIG. 2 is a diagram illustrating an example system for collecting signal data and creating and using signal circles and associated signal reputation scores, according to one or more embodiments.

FIG. 2 is a diagram illustrating an example system for collecting signal data, and creating and using signal circles and associated signal reputation scores, according to one or more embodiments. FIG. 2 includes a collector device 205, and network devices 210A through 210N. Each of collector device 205, and network devices 210A through 210N may be connected across one or more networks 200. Collector device 205 may be a cell phone, tablet, laptop, automobile computing system, or other mobile device. Collector device 205 may include, for example, a memory 220 and processor 225, along with a network interface 235 utilized to connect to network devices 210A through 210N over a network 200. Memory 220 may include a number of software or firmware modules executable by processor 225. In one or more embodiments, memory 220 may include a signal data collection module 230. Signal data collection module 230 may be used to gather signal data including the location of collector device 205, the network provider, the network type, and the timestamp, before sending it over one or more networks 200 to a network device such as network device 210A. In some embodiments, a multitude of collector devices 205 may be used to crowd-source signal data. In this way, the signal data collection requirement on any one single collector device 205 is reduced and the accuracy of collected signal data is confirmed by multiple collector devices 205. The signal data may be collected from independently owned collector devices 205, such as the general population's cell phones, or a set of commonly owned collector devices 205 operated by coordinated agents, for example Google® Street View® cars. (GOOGLE is a registered trademark owned by Google, LLC. STREET VIEW is a registered trademark owned by Google, LLC.) In some embodiments, collector devices 205 that do not meet predetermined criteria may be passed over for signal collection to reduce likelihood of error in signal data. For example, where a collector device 205 is in a low accuracy mode configuration, the signal data accuracy is likely to be compromised and collector device 205 may be excluded from signal data collection. In another example, where a collector device 205 is a model with known defects in global positioning system (GPS) data handling, collector device 205 may be excluded from signal data collection.

Figure 3:
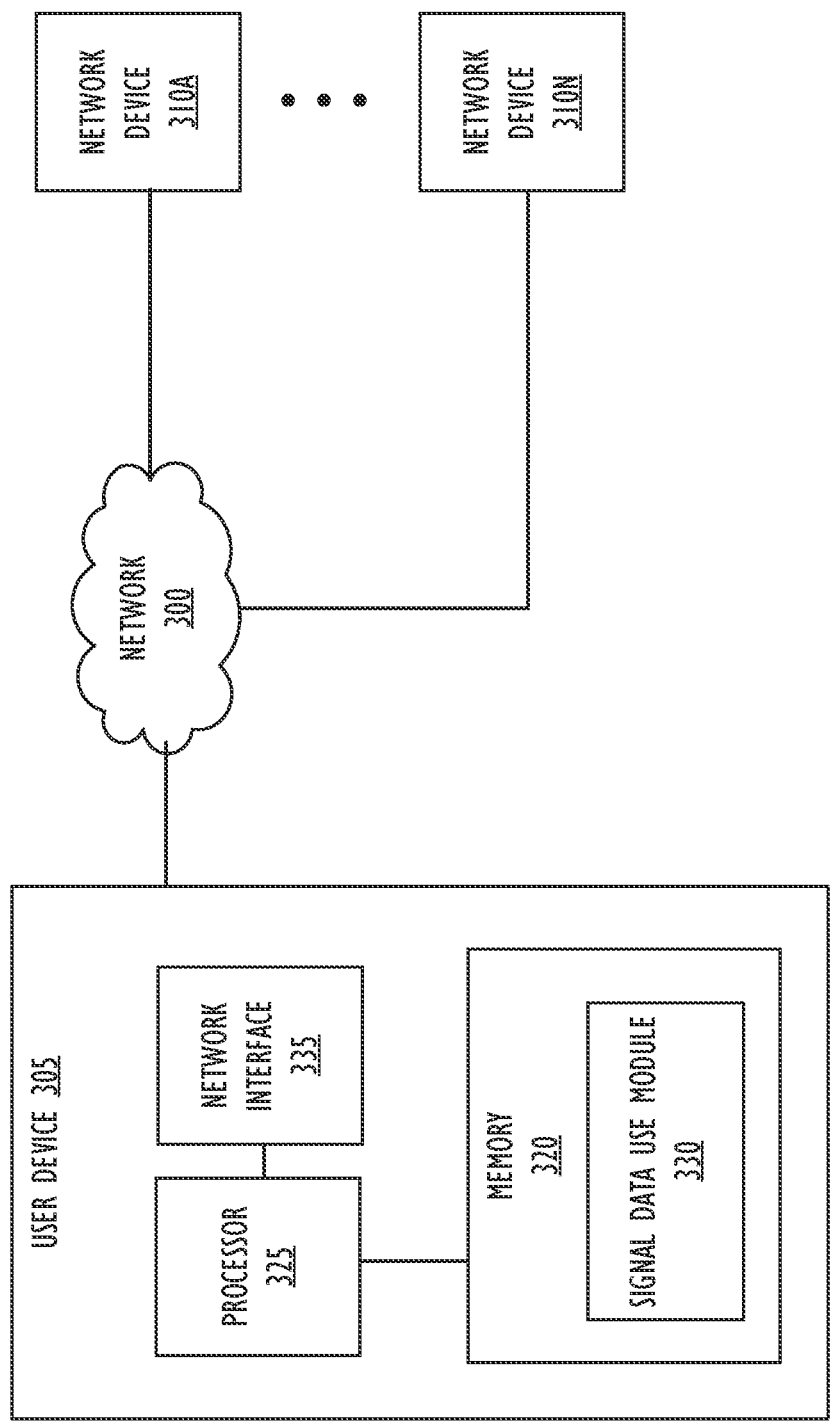
FIG. 3 is a diagram illustrating an example system for using signal data and modifying operation of a user mobile device, according to one or more embodiments.

FIG. 3 is a diagram illustrating an example system for using signal data and modifying operation of a user mobile device, according to one or more embodiments. FIG. 3 includes a user mobile device 305, and network devices 310A through 310N. Each of user mobile device 305, and network devices 310A through 310N may be connected across one or more networks 300. User mobile device 305 may be a cell phone, tablet, laptop, automobile computing system, or other mobile device. User mobile device 305 may include, for example, a memory 320 and processor 325, along with a network interface 335 utilized to connect to network devices 310A through 310N over a network 300. Memory 320 may include a number of software or firmware modules executable by processor 325. In one or more embodiments, memory 320 may include a signal data use module 330. Signal data use module 330 may be used to request signal data over network 300 from one or more network device 310A through 310N. Signal data use module 330 may then use the received signal data to predict dead zones, plan travel routes according to the available signal along the route options, optimize operation of user mobile device 305, and recover operations of user mobile device 305 upon reentry of areas with available signal from dead zones.

Figure 4:
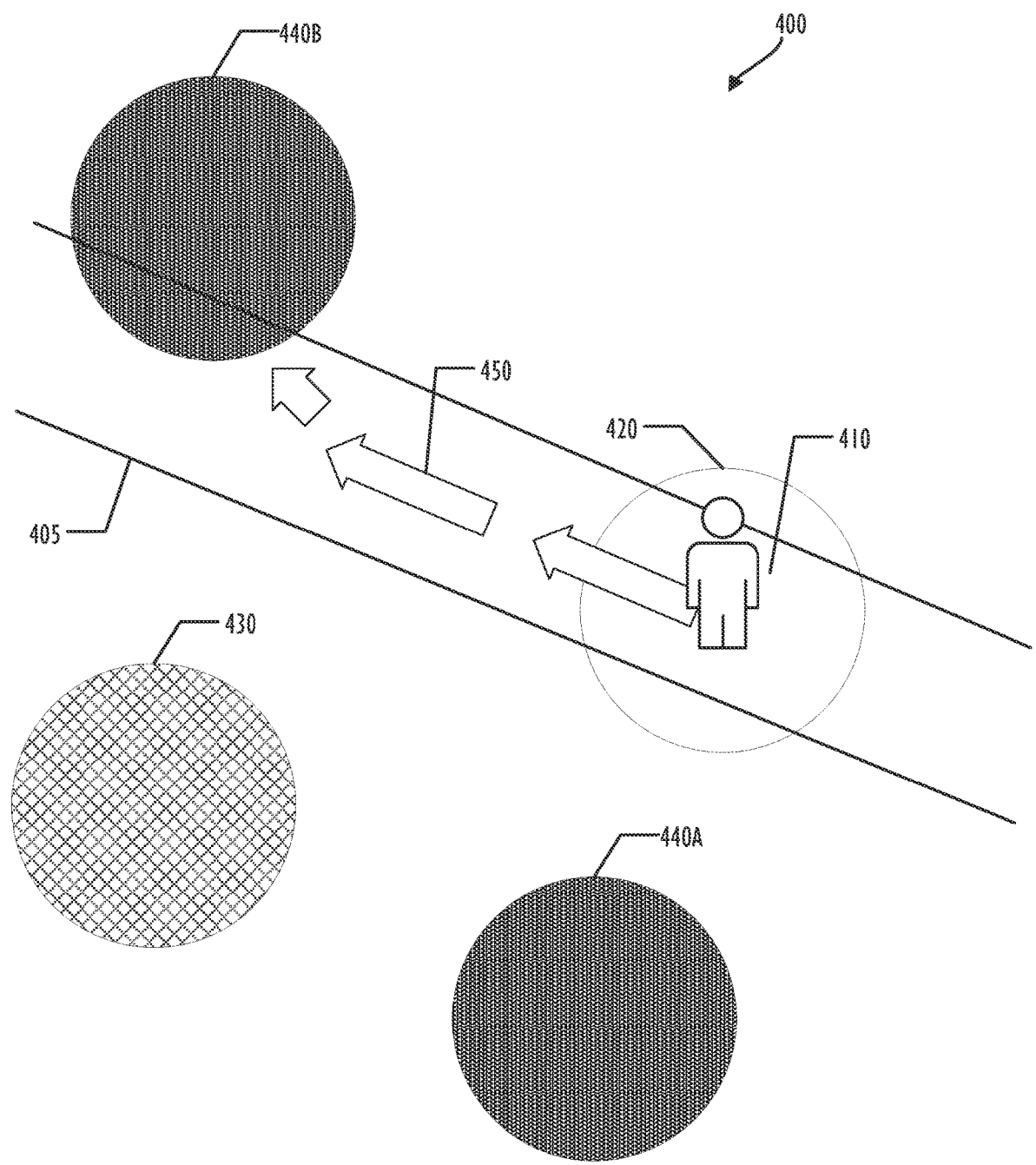
FIG. 4 is a diagram illustrating an overlay of signal circles and a recommended route for a user, according to one or more embodiments.

FIG. 4 is a diagram 400 illustrating an overlay of signal circles and a recommended route for a user, according to one or more embodiments. User 410 is in a signal circle 420 with little or no signal availability, a dead zone. Near user 410 are three other signal circles, signal circles 430, 440A, and 440B. The sparse cross-hatching of signal circle 430 indicates it has only intermediate signal availability, more signal availability than the dead zone signal circle 420 but less than signal circles 440A and 440B, whose dense cross-hatching indicates strong signal availability. According to one embodiment of the present inventions, a signal data use module 330 as described in FIG. 3 may guide a user to a best signal circle from the dead zone signal circle 420. Where there are two nearby signal circles with strong signal availability, such as signal circles 440A and 440B, the signal circle easiest to get to may be selected as the best signal circle. For example, signal circle 440A is nearer user 410, but reaching it would require user 410 to leave the road 405. Instead, the best signal circle is signal circle 440B, which may be reached without leaving the road 405. Signal data use module 330 may guide user 410 to signal circle 440B with route markers 450.

Figure 5:
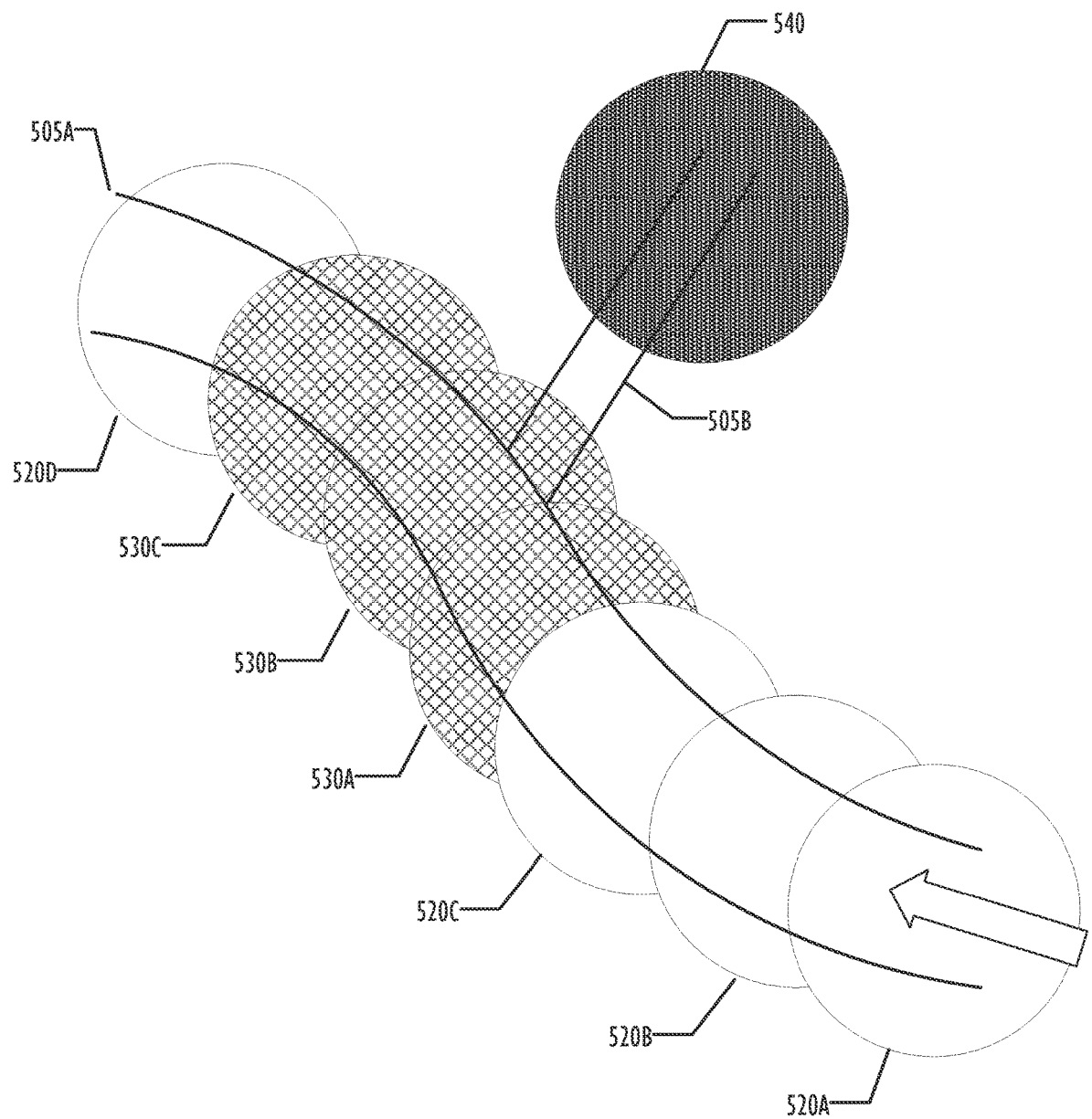
FIG. 5 is a diagram illustrating an overlay of signal circles, according to one or more embodiments.

FIG. 5 is a diagram illustrating an overlay of signal circles, according to one or more embodiments. As in FIG. 4, signal circles with no cross-hatching indicate signal circles with little or no signal availability, dead zones, while signal circles with sparse cross-hatching indicate intermediate signal availability and signal circles with dense cross-hatching indicate strong signal availability. According to one embodiment of the present inventions, signal data use module 330 may predict signal availability along roads 505A and 505B. Road 505A has only intermediate signal availability signal circles 530A through 530C and dead zone signal circles 520A through 520D. However, road 505B which connects to road 505A has a signal circle with strong signal availability, signal circle 540. Signal data use module 330 may recommend performing all user mobile device 305 operations dependent on strong signal availability before beginning travel along road 505A or recommend diverting from road 505A to road 505B for a brief stop in signal circle 540 to make use of the strong signal availability.

Figure 6:
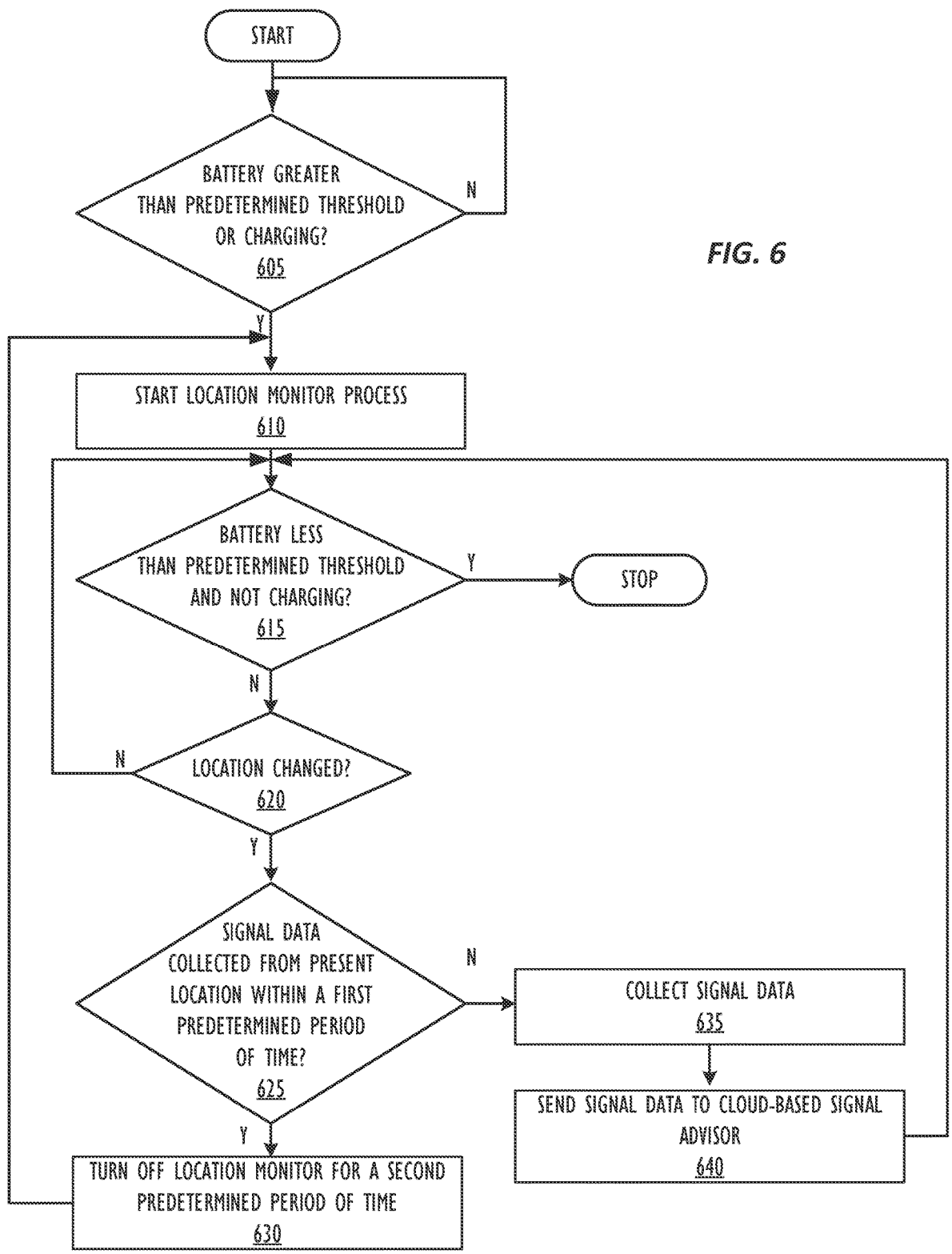
FIG. 6 is a flowchart illustrating a procedure for collecting signal reputation data, according to one or more embodiments.

FIG. 6 is a flowchart illustrating a procedure for collecting signal reputation data, according to one or more embodiments. The procedure begins at 605 where a determination may be made whether collector device 205's battery has a charge level greater than a predetermined threshold or is charging. If the battery has a charge level less than the predetermined threshold and is not charging, the battery status may remain monitored but no data is collected using collector device 205. When a change in battery status is detected, data may be collected using collector device 205. In this way, collection of signal reputation data does not unnecessarily drain collector device 205's battery. If collector device 205's battery has a charge level greater than the predetermined threshold or charging, the procedure may continue to 610 and a location monitoring procedure may be started. Next, at 615, the collector device 205's battery status may be checked. If the battery has a charge level less than the predetermined threshold and is not charging, the signal reputation data collection procedure may stop. This prevents draining the battery while collecting signal data. If the battery has a charge level greater than or equal to the predetermined threshold or is charging, the procedure may continue to 620, where a determination may be made whether a change in location of the collector device 205 has occurred. If no change in location of collector device 205 has occurred, the procedure may return to 615 and may continue monitoring the battery status and changes in location of collector device 205 until a change in location is detected. If a change in location of collector device 205 is detected, the procedure may continue to 625 where a determination may be made whether signal data has been collected for the location of collector device 205 within a first predetermined period of time. If collector device 205 performs the procedure locally, it may query a remote database to determine how recently signal data for collector device 205's location has been collected or may itself maintain information about previous collections of signal data at that location. If signal data has been collected for the location of collector device 205 recently enough, there is no need to waste collector device 205's battery gathering repeat data and the location monitor may be turned off in block 630 for a second predetermined period of time. At the end of the second predetermined period of time, the procedure may return to 610 and the location monitor procedure starts again. If, in 625, the determination is made signal data has not been collected for the location of collector device 205 within the first predetermined period of time, signal data may be collected at 635 before being sent to a cloud-based signal advisor, such as signal advisor cloud 1260 discussed below in reference to FIG. 12, at 640. The signal data collected may include various data elements, such as the location, signal strength, signal provider, network type, and a timestamp. In some embodiments, the signal data may be combined with event data, such as call drops, ongoing calls, upload and download speeds or failures, and the like. Event data may be used to confirm the accuracy of the signal data. Once the signal data has been sent to signal advisor cloud 1260, the procedure may return to 615 and continue to monitor both the battery charge level and changes in location of collector device 205. This procedure may repeat until the battery charge level drops below the predetermined threshold and is not charging.

The procedure described in FIG. 6 may be performed by collector device 205 itself or performed remotely by signal advisor cloud 1260 in combination with collector device 205. For example, signal advisor cloud 1260 may query collector device 205 for a battery charge level status at 605 and determine whether collector device 205's battery charge level is greater than a predetermined threshold or is charging from the received battery charge level status. At 610, signal advisor cloud 1260 may begin to monitor the location of collector device 205 by periodically querying collector device 205 for location status. At 615, signal advisor cloud 1260 may periodically query collector device 205 for battery charge level status. From the received battery charge level statuses, signal advisor cloud 1260 may determine whether the battery charge level is less than the predetermined threshold and is not charging at 615 and may stop the data collection procedure where the battery charge level is determined to be less than the predetermined threshold and is not charging. From the received location statuses, signal advisor cloud 1260 may determine whether the location of collector device 205 has changed at 620. At 625, signal advisor cloud 1260 may determine whether signal data has been collected from the location of collector device 205 within a first predetermined period of time. If signal data has been collected, signal advisor cloud 1260 may stop monitoring the location of collector device 205 for a second predetermined period of time. If signal data has not been collected, signal advisor cloud 1260 may request the signal data from collector device 205 at 635, which collector device 205 will send and signal advisor cloud 1260 receive at 640.

Figure 7:
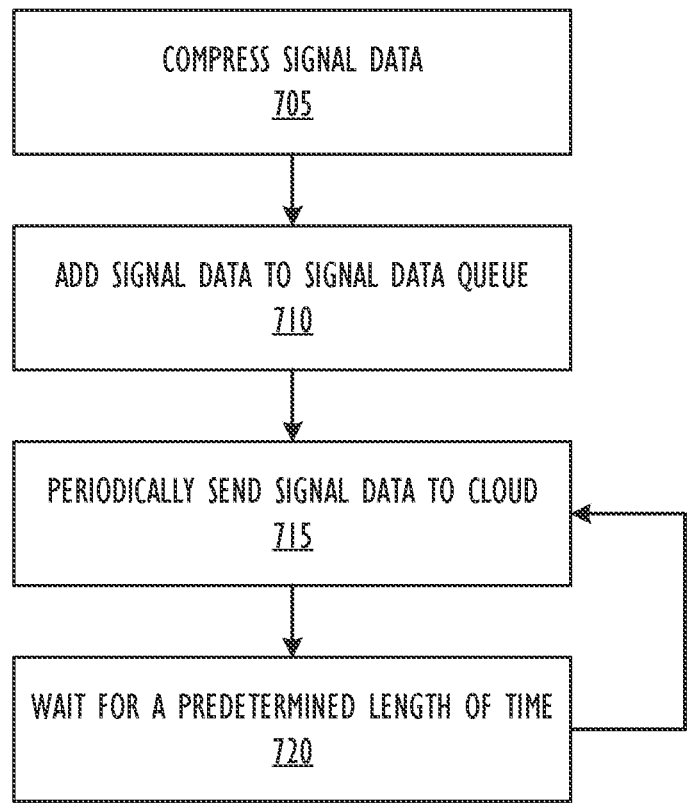
FIG. 7 is a flowchart illustrating a procedure for periodically sending signal data to a cloud-based signal advisor, according to one or more embodiments.

FIG. 7 is a flowchart illustrating a procedure for periodically sending signal data to the cloud-based signal advisor instead of sending signal data as it is collected in 640, according to one or more embodiments. Periodically sending signal data to the cloud-based signal advisor such as signal advisor cloud 1260 conserves collector device 205's battery charge level. In some embodiments, the signal data may be sent to signal advisor cloud 1260 only where the location of collector device 205 has signal availability meeting a predetermined threshold, preventing failure of the sending. The procedure for periodically sending signal data may begin at 705 where signal data may be compressed. Next, at 710, the signal data may be added to a signal data queue. The signal data queue may be a first-in, first-out or a last-in, first-out queue, or any other ordering. At 715, the signal data queue's contents may be sent periodically to signal advisor cloud 1260, a remote database, or the like. Collector device 205 may then wait for a predetermined length of time at 720 before returning to 715 to send an updated signal data queue's contents. In some embodiments, instead of sending the signal data to signal advisor cloud 1260 periodically, the signal data may be sent aperiodically, such as whenever the queue's contents reach a certain size or the queue reaches a certain number of entries.

Figure 8:
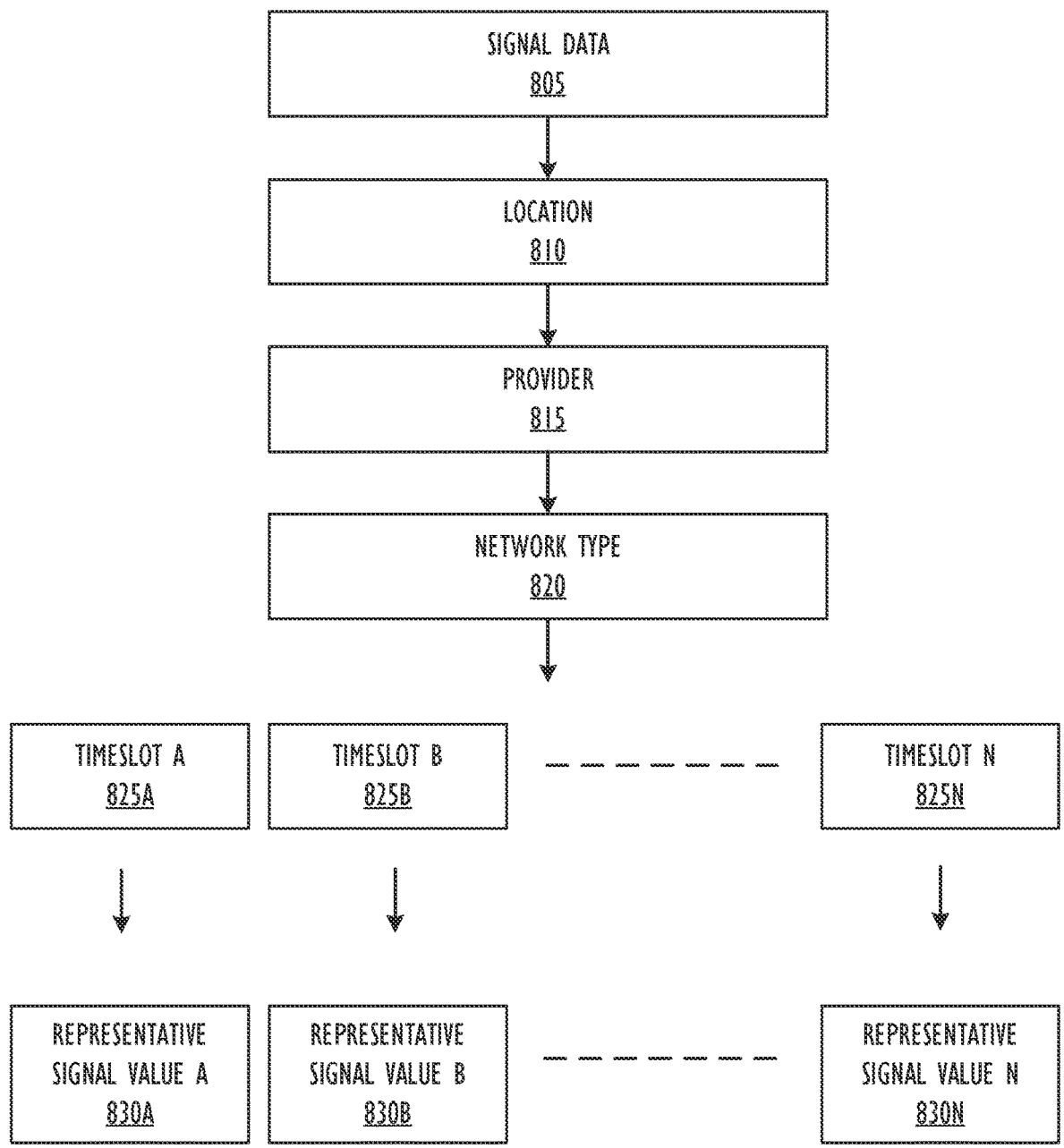
FIG. 8 is a diagram illustrating the division of signal data into categories, according to one or more embodiments.

FIG. 8 is a diagram illustrating the division of signal data into groups, according to one or more embodiments. Once a certain amount of signal data has been collected, the signal data may be divided into groups to simplify formation of signal circles and calculation of associated signal reputation scores. The signal data may be divided into groups by any appropriate criteria. In one embodiment, the signal data in 805 may be grouped by location. The signal data grouped by location in 810 may be further grouped by signal provider. The signal data grouped by both location and signal provider in 815 may be further grouped by network type. The signal data grouped by location, signal provider, and network type in 820 may then be categorized into groups representing a predetermined period of time. For example, timeslot A (825A) may represent a one hour period from midnight to one AM for the Washington Monument, Verizon®, and 3G network type. (VERIZON is a registered trademark of Verizon Trademark Services, LLC.) Timeslot B 825B may represent a one hour period from one AM to two AM for the Washington Monument, Verizon®, and 3G network type, and the like through timeslot N 825N. Once all the signal data is categorized, a single representative signal value for each category may be determined. In some embodiments, the single representative signal value is determined by calculating a moving average within each category. For example, the signal data grouped into timeslot 825A may be averaged together into representative signal value A (830A), and so on through timeslot N (825N) into representative signal value N (830N). In this way, the noise and volume of signal data may be reduced. The moving average may be represented by the equation $$\text{representative signal } value_{category} = \frac{\sum_{i=0}^{n}(SignalData_i)}{n},$$

where n represents the time period over which the signal data has been collected and $SignalData_i$ represents the signal data included in the category.

Figure 9:
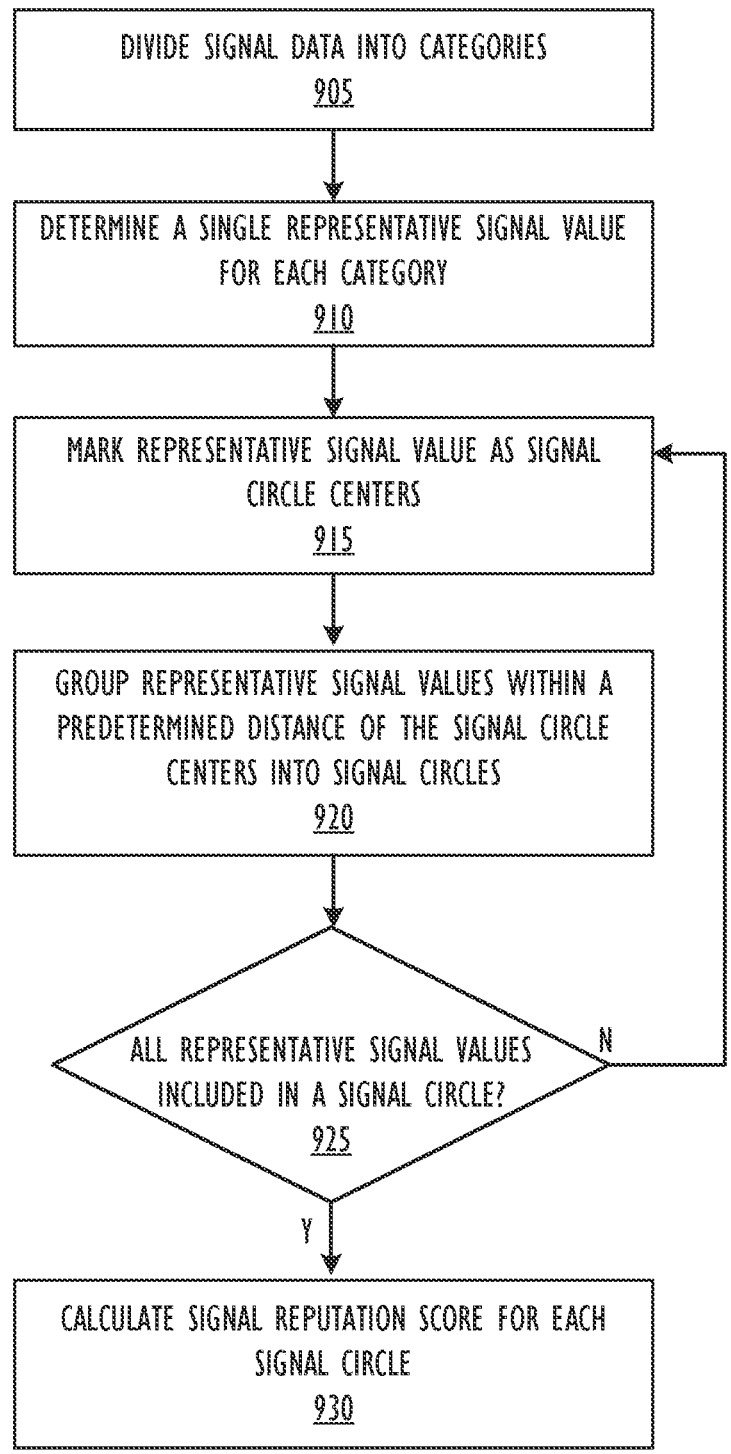
FIG. 9 is a flowchart illustrating a procedure for dividing signal data into signal circles and calculating signal reputation scores, according to one or more embodiments.

FIG. 9 is a flowchart illustrating a procedure for dividing signal data into signal circles and calculating signal reputation scores, according to one or more embodiments. First, at 905, signal data may be divided into categories, for example as discussed in FIG. 8 at 805-825. Then, at 910, a single representative signal value may be determined for each category, for example as discussed in FIG. 8 at 830. At 915, representative signal values may be marked as signal circle centers. For example, according to the illustrated example, representative signal values are marked as signal circle centers when they are highest representative signal value in their category. Then, at 920, representative signal values corresponding to a location within a predetermined distance of the location of signal circle centers may be grouped into signal circles. Next, at 925, the determination may be made whether all representative signal values are included in a signal circle. If not, representative signal values already included in a signal circle may be removed from consideration, and the procedure may return to 915. Under this procedure of grouping representative signal values, two signal circles may overlap but not share representative signal values. If all representative signal values are included in a signal circle, the procedure may continue to 930, where signal reputation scores may be calculated for each signal circle using the representative signal values grouped into each signal circle. Signal reputation scores may be calculated using any appropriate method. For example, first, all representative signal values within the signal circle may be averaged together, $$\frac{\sum_{c}^{Z} \text{representative signal } value_i}{N}$$

where Z represents the last representative signal value in the signal circle, c represents the representative signal value marked as the center of the signal circle, representative signal $value_i$ represents each representative signal value within the signal circle, and N represents the number of signal values in the signal circle. Second, the probability of call drops weighted by a rounding factor may be subtracted from the average, $$2\left(\frac{D}{T}\right),$$

where D represents the number of dropped calls in the location, T represents the total number of calls attempted, and the rounding factor, which for example is equal to two. In some embodiments, the probability of call drops is only considered where the number of dropped calls in the location is greater than ten. Third, a weight may be added based on location type, Geo_type. For example, public property may be weighted more heavily than private property and roads and parking lots weighted more heavily than undeveloped land. In some embodiments, public place=0.5, road=0.3, GroundorPark=0.3, PrivateProperty=0.1, Other=0. This technique for calculating signal reputation scores may be represented by the equation Signal Score of a $$\text{Signal Circle} = \frac{\sum_{c}^{Z} \text{representative signal } value_i}{N} - 2\left(\frac{D}{T}\right) + \text{Geo\_type}.$$

After the signal circles and the associated signal reputation scores are determined, they are available for use in predicting dead zones and planning user mobile device operation accordingly.

Figure 10:
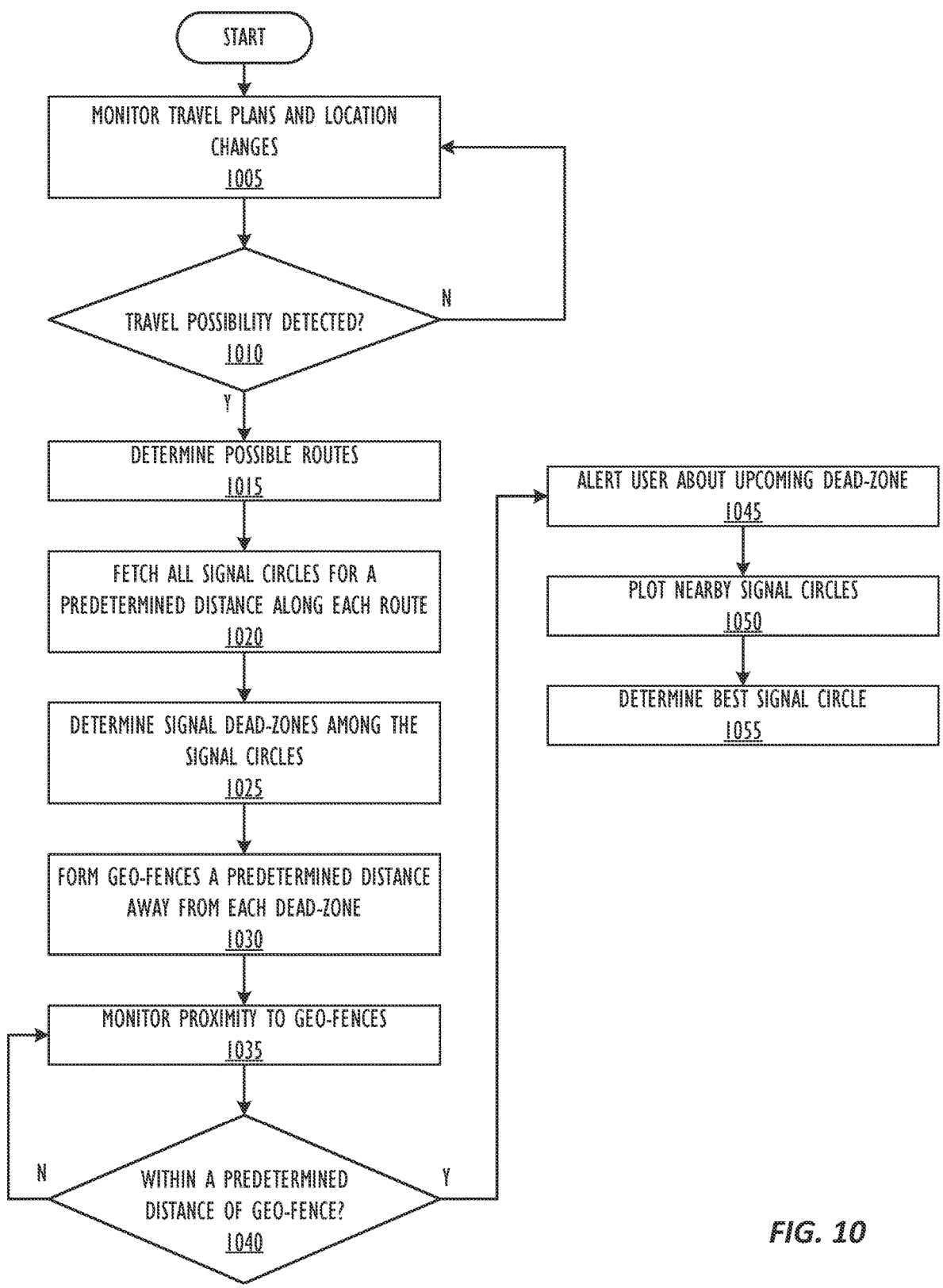
FIG. 10 is a flowchart illustrating a procedure for using signal reputation data, according to one or more embodiments.

FIG. 10 is a flowchart illustrating a procedure for using signal reputation data, according to one or more embodiments. The flowchart begins at 1005, where travel plans and location changes of a user's device, such as user mobile device 305, may be monitored. At 1010, the determination may be made whether travel possibility is detected. For example, where user mobile device 305's calendar program indicates an upcoming appointment at location A, user mobile device 305's current location may be compared with location A and if user mobile device 305 is not already at location A, a travel possibility may be detected. If no travel possibility is detected, the procedure continues to monitor travel plans and location changes of user mobile device 305 at 1005. Where travel possibility is detected, possible routes may be determined at 1015. Possible routes may be determined based on the intended destination if known, nearby traffic, routine travel patterns, and nearby modes of transportation. Next, at 1020, all signal circles located within a predetermined distance along each possible route may be fetched. Continuing to 1025, signal dead zones among the fetched signal circles may be determined. Geo-fences may be formed a predetermined distance away from each dead zone at 1030. Next, at 1035, user mobile device 305's proximity to the geo-fences may be monitored. If user mobile device 305 is determined to be located outside a predetermined distance of a geo-fence at 1040, the procedure may return to 1035 and continue to monitor user mobile device 305's proximity to the geo-fences. If user mobile device 305 is determined to be located within a predetermined distance of a geo-fence at 1040, the procedure may continue to 1045, where a user may be alerted of the upcoming dead zone. At 1050, nearby signal circles may be plotted or otherwise determined and the best signal circle may be determined at 1055. Determining the best signal circle may consider factors such as the location of user mobile device 305, signal reputation scores, the mode of transportation, and user preferences, although other factors may be used as desired. For example, if the user is walking, the appropriate distance between user mobile device 305's current location and the best signal circle may be much shorter than if the user is driving. As another example, if it is night time and the user has indicated safety is a priority, the best signal circle may be determined to be one in a public area where other people might be or signal circles with associated location safety reputations above a predetermined minimum threshold. In one embodiment, the best signal circle may be determined using the following pseudo code:

route from user mobile device 305's current location to the best signal circle may be automatically generated.

In one embodiment, the procedure depicted by the flowchart in FIG. 5 may be performed entirely by user mobile device 305, so that the user mobile device 305 functions as a collector device. User mobile device 305 may monitor travel plans and location changes and detect travel possibilities itself at 1005 and 1010. At 1015, user mobile device 305 may coordinate with map services such as map services 1244 discussed in FIG. 12. At 1020, user mobile device 305 may request appropriate signal circles from a remote signal reputation database containing signal circles and associated signal reputation scores, such as signal reputation database 1266 discussed in FIG. 12. The rest of the procedure may then be performed by user mobile device 305 locally. In another embodiment, the procedure may be performed remotely from user mobile device 305, on a cloud-based signal advisor, such as signal advisor cloud 1260 discussed in FIG. 12. Signal advisor cloud 1260 may query user mobile device 305 for status updates including travel plans and location changes at 1005. Where a travel possibility is detected at 1010, signal advisor cloud 1260 may determine possible routes based on its own maps or in coordination with a third party mapping service, such as map services 1244 discussed in FIG. 12. Once possible routes are determined, signal advisor cloud 1260 may fetch all signal circles for a predetermined distance along each route from a remote database, such as signal reputation database 1266 discussed in FIG. 12. Signal advisor cloud 1260 may then perform steps 1025 and 1030 independently, before querying user

```
IF current time is not equal to safeHours( ) <5 AM - 10 PM>
    Signal Circle place type should be public place.
ELSE
    IF user profile is equal to female or elderly
        IF mode of conveyance is equal to walking
            Farthest Signal Circle should be 200 meters away.
            Signal Circle place type should be public place.
        ELSE
            Farthest Signal Circle should be 400 meters away.
            Signal Circle place type should be road.
    IF user profile is equal to adult male
        IF mode of conveyance is equal to walking
            Farthest Signal Circle should be 400 meters away.
            Signal Circle place type should be public place.
        ELSE
            Farthest Signal Circle should be 400 meters away.
            Signal Circle place type should be road.
    IF user profile is equal to group of individuals
        IF mode of conveyance is equal to walking
            Farthest Signal Circle should be 400 meters away.
            Signal Circle place type should be public place or road or ground or park.
        ELSE
            Farthest Signal Circle should be 400 meters away.
            Signal Circle place type should be road.
IF number of Signal Circles found is 0
    Ask for user's preferences for place type and maximum distance of Signal Circle.
Determine all the circles for place type and max distance of signal circle.
Select the circle with highest reliability
IF number of Signal Circles found is greater than 1
    Get the signal circle having maximum number of Samaritans
``` where Samaritans are other users of the inventions who have agreed to be listed as Samaritans.

Predicted dead zones and best signal circles allow user mobile device 305 to prioritize connectivity dependent operations and prepare for loss of signal. For example, user mobile device 305 may download a map such that a user has access to navigation services without connectivity. As another example, user mobile device 305 may pause document upload and prioritize a call. In some embodiments, a mobile device 305 for location updates to monitor user mobile device 305's proximity to the geo-fences. Once user mobile device 305 is within a predetermined distance of the geo-fence, signal advisor cloud 1260 may send an alert to user mobile device 305 about the upcoming dead zone. At 1050 and 1055, signal advisor cloud 1260 may plot nearby signal circles and determine the best signal circle. In some embodiments, signal advisor cloud 1260 may recommend changes to operation of user mobile device 305 or prompt those changes in operation of user mobile device 305 itself. In other embodiments, signal advisor cloud 1260 may send supplemental information to user mobile device 305, such as navigation information and the like.

Figure 11A:
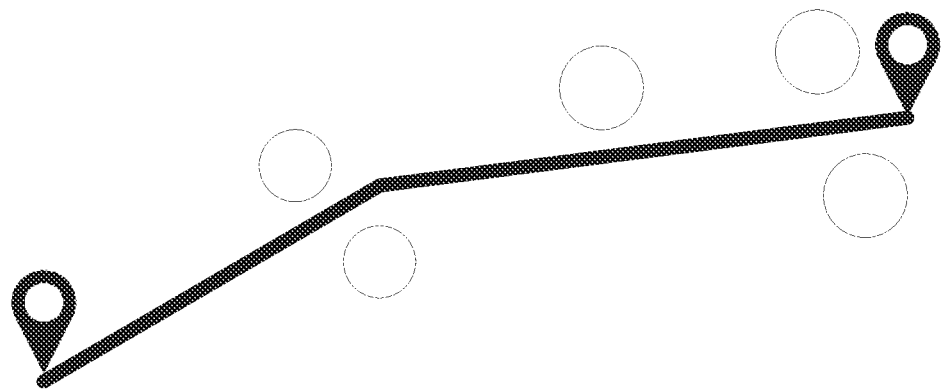
FIGS. 11A and 11B show two techniques of prefetching signal reputation data, according to one or more embodiments.
Figure 11B:
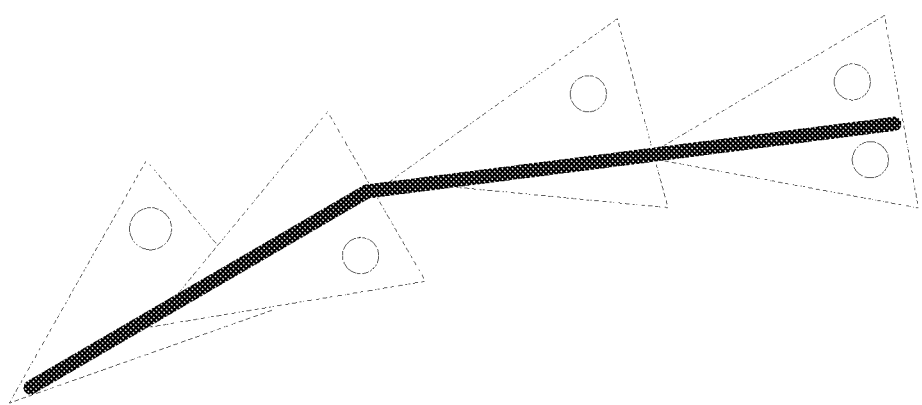

FIGS. 11A and 11B show two processes of prefetching signal reputation data, according to one or more embodiments. In FIG. 11A, destination and route are known parameters, allowing signal circles along the entire route and no excess to be fetched. Where a user mobile device, such as user mobile device 305 discussed in FIG. 3, deviates from a known route, the procedure may switch from static prefetching shown in FIG. 11A to dynamic prefetching shown in FIG. 11B. In FIG. 11B, signal circles may be dynamically fetched based on user mobile device 305's current location. In this embodiment, the signal circles may be fetched from a triangular shaped area, where user mobile device 305's current location is one point and user mobile device 305's heading directs the triangle. The area covered by the triangle may be determined based on user mobile device 305's mode and speed of transportation as well as possible paths of travel. For example, where user mobile device 305 is travelling in a car at high speed on a highway, the dynamic prefetching may focus the triangle shape along the highway's path and cover a surface area appropriate for the high speed, such as a mile along each side. The use of a triangular shape is illustrative and by way of example only, and other shaped areas may be used as desired.

Figure 12:
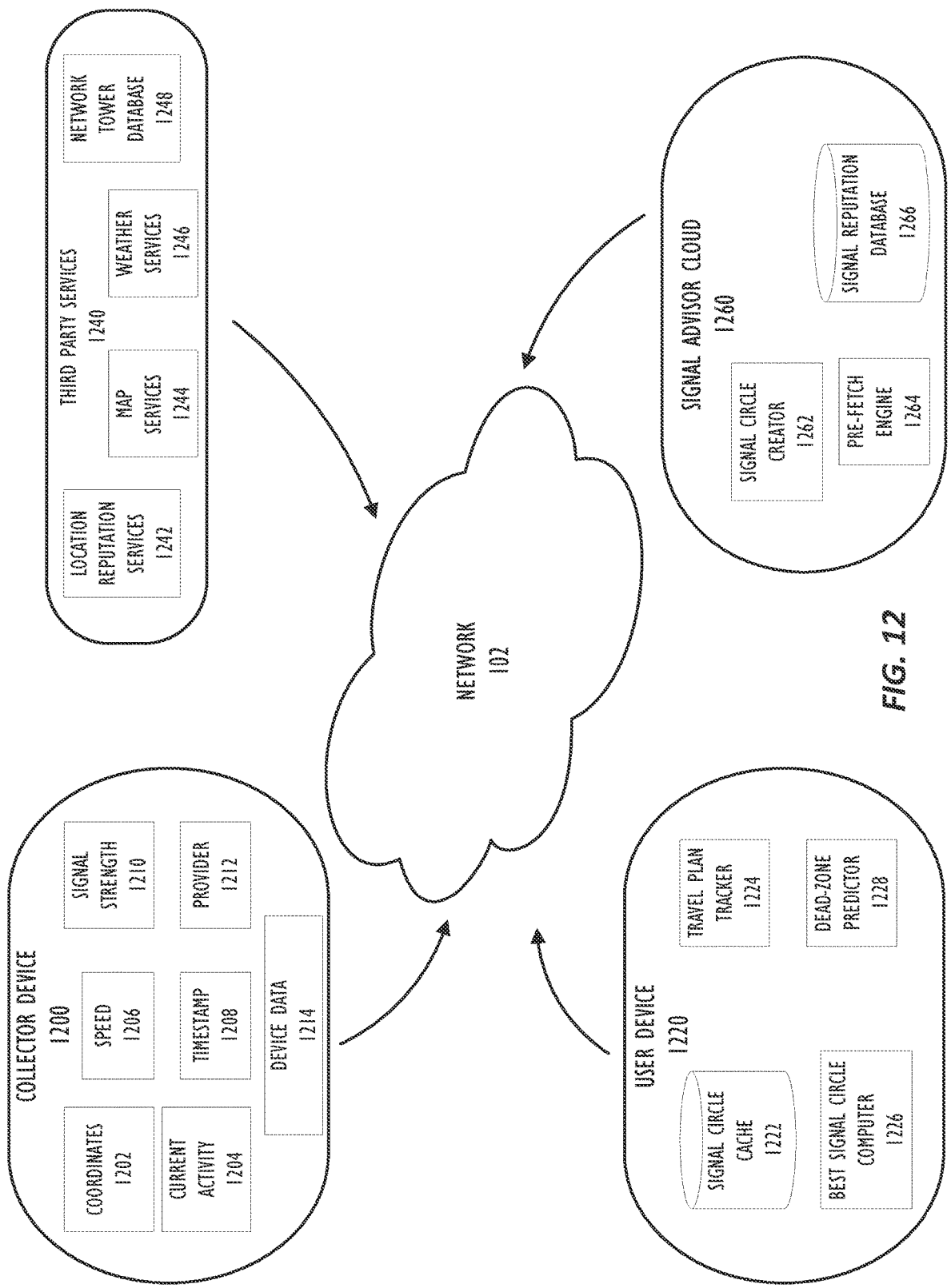
FIG. 12 is a diagram illustrating one implementation of processes of collecting and using signal reputation data, according to one or more embodiments.

FIG. 12 is a diagram illustrating one implementation of procedures of collecting and using signal reputation data, according to one or more embodiments. As discussed previously, the procedures of collecting signal data, determining signal circles and associated signal reputation scores, and using signal reputation data may be performed by a number of devices. FIG. 12 illustrates one possible implementation of the procedures on a number of devices communicating over network 102. In this embodiment, signal data may be crowd-sourced from a number of collector devices such as collector device 1200 and sent to signal reputation database 1266 in signal advisor cloud 1260. Collector device 1200 may include coordinates module 1202, a current activity module 1204, a speed module 1206, a timestamp module 1208, a signal strength module 1210, a provider module 1212, and a device data module 1214. As discussed previously with reference to FIG. 2, the signal data may include timestamp data from timestamp module 1208, signal strength data from signal strength module 1210, location data from coordinates module 1202, and signal provider data from provider module 1212. Where collector device 1200 does not meet predetermined device requirements as determined by device data included in device data module 1214, the signal data may be discarded. Data from the current activity module 1204 and speed module 1206 may be used to evaluate the battery status of collector device 1200 and determine whether to continue collecting signal data from collector device 1200. Within signal advisor cloud 1260, signal circle creator 1262 may periodically analyze the crowd-sourced signal data to categorize the signal data and create and update signal circles and associated signal reputation scores. In some embodiments, signal circle creator 1262 may coordinate with third party services 1240 such as location reputation services 1242 to include location safety in the associated signal reputation scores. User mobile device 1220 may include travel plan tracker 1224 which sends its travel plans to signal advisor cloud 1260, where prefetch engine 1264 may gather and send appropriate signal circles to user mobile device 1220 based on the travel plans. In some embodiments, travel plan tracker 1224, prefetch engine 1264, or both may coordinate with third party services 1240 and map services 1244 to determine routes and appropriate signal circles. User mobile device 1220 may store the appropriate signal circles in signal circle cache 1222, predict dead zones from the appropriate signal circles using dead zone predictor 1228, and determine the best signal circle using best signal circle computer 1226. In some embodiments, best signal circle computer 1226 may coordinate with third party services 1240 to include weather services 1246 and network tower database 1248 in the determination of the best signal circle.

Figure 13:
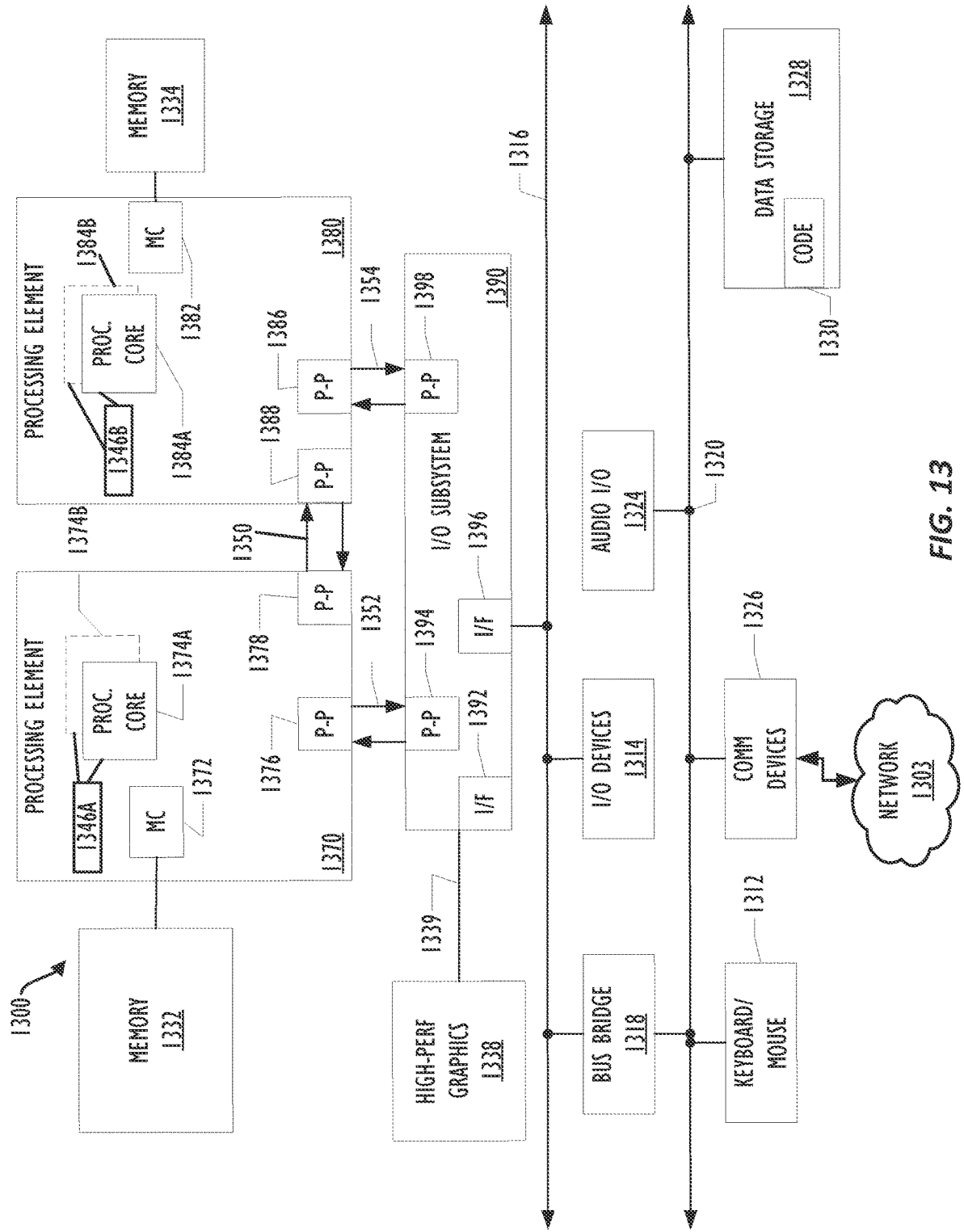
FIG. 13 is a diagram illustrating a computing device for use with techniques described herein according to one embodiment.

Referring now to FIG. 13, a block diagram illustrates a programmable device 1300 that may be used within a network device, such as devices 205 and 305, in accordance with one or more embodiments. Devices 205 and 305 may not include all of the elements of FIG. 13. The programmable device 1300 illustrated in FIG. 13 is a multiprocessor programmable device that includes a first processing element 1370 and a second processing element 1380. While two processing elements 1370 and 1380 are shown, an embodiment of programmable device 1300 may also include only one such processing element.

Programmable device 1300 is illustrated as a point-to-point interconnect system, in which the first processing element 1370 and second processing element 1380 are coupled via a point-to-point interconnect 1350. Any or all of the interconnects illustrated in FIG. 13 may be implemented as a multi-drop bus rather than point-to-point interconnects.

As illustrated in FIG. 13, each of processing elements 1370 and 1380 may be multicore processors, including first and second processor cores (i.e., processor cores 1374a and 1374b and processor cores 1384a and 1384b). Such cores 1374a, 1374b, 1384a, 1384b may be configured to execute instruction code in a manner similar to that discussed above in connection with FIGS. 1-12. However, other embodiments may use processing elements that are single core processors as desired. In embodiments with multiple processing elements 1370, 1380, each processing element may be implemented with different numbers of cores as desired.

Each processing element 1370, 1380 may include at least one shared cache 1346. The shared cache 1346a, 1346b may store data (e.g., instructions) that are utilized by one or more components of the processing element, such as the cores 1374a, 1374b and 1384a, 1384b, respectively. For example, the shared cache 1346a, 1346b may locally cache data stored in a memory 1332, 1334 for faster access by components of the processing elements 1370, 1380. In one or more embodiments, the shared cache 1346a, 1346b may include one or more mid-level caches, such as level 2 (L2), level 3 (L3), level 4 (L4), or other levels of cache, a last level cache (LLC), or combinations thereof.

While FIG. 13 illustrates a programmable device with two processing elements 1370, 1380 for clarity of the drawing, the scope of the present inventions is not so limited and any number of processing elements may be present. Alternatively, one or more of processing elements 1370, 1380 may be an element other than a processor, such as an graphics processing unit (GPU), a digital signal processing (DSP) unit, a field programmable gate array, or any other programmable processing element. Processing element 1380 may be heterogeneous or asymmetric to processing element 1370. There may be a variety of differences between processing elements 1370, 1380 in terms of a spectrum of metrics of merit including architectural, micro-architectural, thermal, power consumption characteristics, and the like. These differences may effectively manifest themselves as asymmetry and heterogeneity amongst processing elements 1370,

1380. In some embodiments, the various processing elements 1370, 1380 may reside in the same die package.

First processing element 1370 may further include memory controller logic (MC) 1372 and point-to-point (P-P) interconnects 1376 and 1378. Similarly, second processing element 1380 may include a MC 1382 and P-P interconnects 1386 and 1388. As illustrated in FIG. 13, MCs 1372 and 1382 couple processing elements 1370 and 1380 to respective memories, namely a memory 1332 and a memory 1334, which may be portions of main memory locally attached to the respective processors. While MC logic 1372 and 1382 is illustrated as integrated into processing elements 1370 and 1380, in some embodiments the memory controller logic may be discrete logic outside processing elements 1370, 1380 rather than integrated therein.

Processing element 1370 and processing element 1380 may be coupled to an I/O subsystem 1390 via respective P-P interconnects 1376 and 1386 through links 1352 and 1354. As illustrated in FIG. 13, I/O subsystem 1390 includes P-P interconnects 1394 and 1398. Furthermore, I/O subsystem 1390 includes an interface 1392 to couple I/O subsystem 1390 with a high performance graphics engine 1338. In one embodiment, a bus (not shown) may be used to couple graphics engine 1338 to I/O subsystem 1390. Alternately, a point-to-point interconnect 1339 may couple these components.

In turn, I/O subsystem 1390 may be coupled to a first link 1316 via an interface 1396. In one embodiment, first link 1316 may be a Peripheral Component Interconnect (PCI) bus, or a bus such as a PCI Express bus or another I/O interconnect bus, although the scope of the present inventions is not so limited.

As illustrated in FIG. 13, various I/O devices 1314, 1324 may be coupled to first link 1316, along with a bridge 1318 which may couple first link 1316 to a second link 1320. In one embodiment, second link 1320 may be a low pin count (LPC) bus. Various devices may be coupled to second link 1320 including, for example, a keyboard/mouse 1312, communication device(s) 1326 (which may in turn be in communication with the computer network 1303), and a data storage unit 1328 such as a disk drive or other mass storage device which may include code 1330, in one embodiment. The code 1330 may include instructions for performing embodiments of one or more of the techniques described above. Further, an audio I/O 1324 may be coupled to second bus 1320.

Other embodiments are contemplated. For example, instead of the point-to-point architecture of FIG. 13, a system may implement a multi-drop bus or another such communication topology. Although links 1316 and 1320 are illustrated as busses in FIG. 13, any desired type of link may be used. Also, the elements of FIG. 13 may alternatively be partitioned using more or fewer integrated chips than illustrated in FIG. 13.

Figure 14:
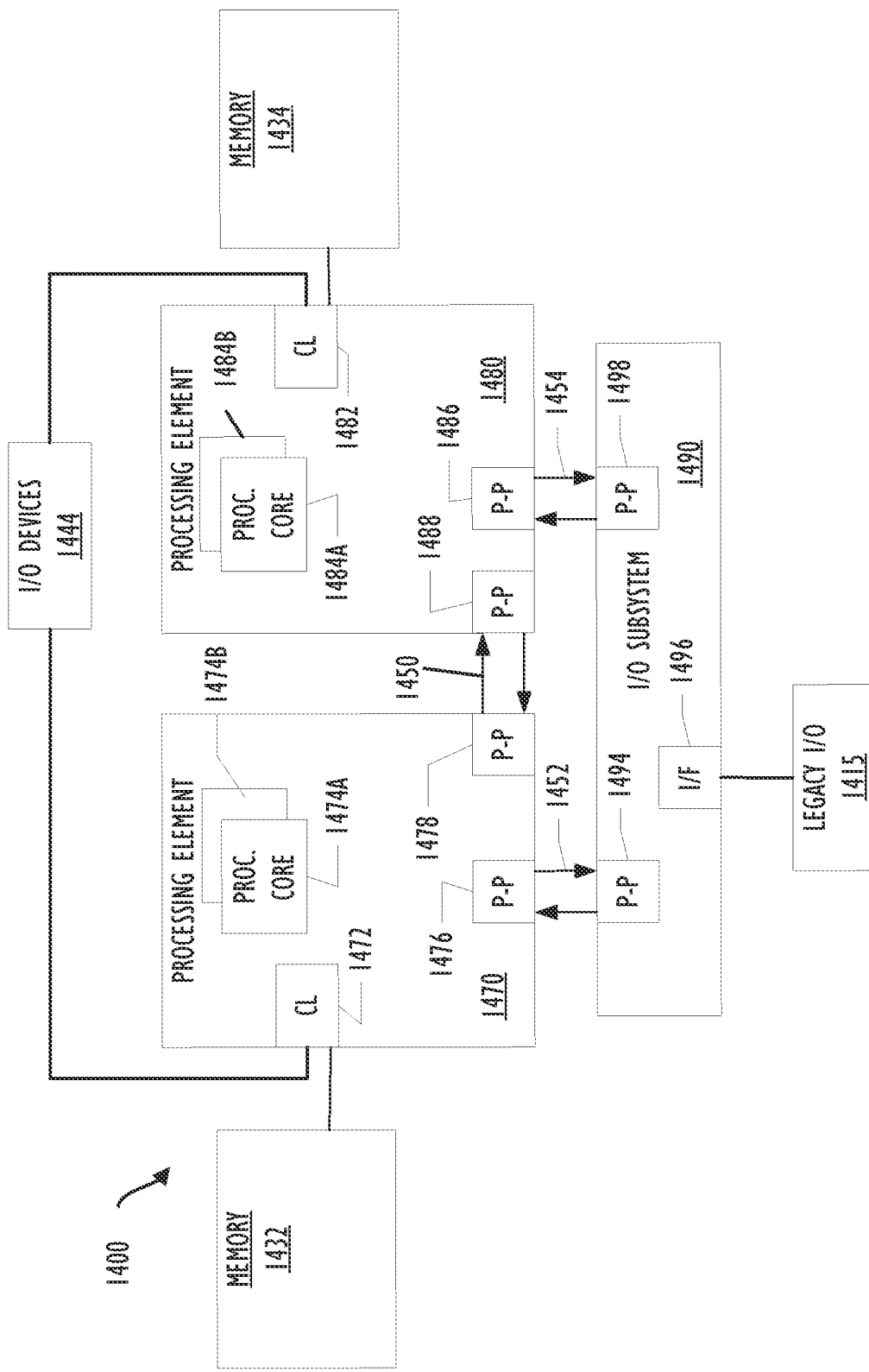
FIG. 14 is a block diagram illustrating a computing device for use with techniques described herein according to another embodiment.

Referring now to FIG. 14, a block diagram illustrates a programmable device 205 or 305 according to another embodiment. Certain aspects of FIG. 13 have been omitted from FIG. 14 in order to avoid obscuring other aspects of FIG. 13.

FIG. 14 illustrates that processing elements 1470 and 1480 may include integrated memory and I/O control logic ("CL") 1472 and 1482, respectively. In some embodiments, the 1472, 1482 may include memory control logic (MC) such as that described above in connection with FIG. 13. In addition, CL 1472, 1482 may also include I/O control logic. FIG. 13 illustrates that not only may the memories 1432, 1434 be coupled to the 1472, 1482, but also that I/O devices 1444 may also be coupled to the control logic 1472, 1482. Legacy I/O devices 1415 may be coupled to the I/O subsystem 1490 by interface 1496. Each processing element 1470, 1480 may include multiple processor cores, illustrated in FIG. 13 as processor cores 1474A, 1474B, 1484A, and 1484B. As illustrated in FIG. 13, I/O subsystem 1490 includes P-P interconnects 1494 and 1498 that connect to P-P interconnects 1476 and 1486 of the processing elements 1470 and 1480 with links 1452 and 1454. Processing elements 1470 and 1480 may also be interconnected by link 1450 and interconnects 1478 and 1488, respectively.

The programmable devices depicted in FIGS. 13 and 14 are schematic illustrations of embodiments of programmable devices which may be utilized to implement various embodiments discussed herein. Various components of the programmable devices depicted in FIGS. 13 and 14 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a method of collecting signal information for use by a mobile device, comprising: obtaining a plurality of signal reputation data corresponding to a plurality of locations of a collector device; categorizing the plurality of signal reputation data into a plurality of groups; calculating a plurality of signal circles corresponding to at least some of the plurality of groups, based on a representative signal value for the corresponding group; calculating a signal reputation score for each signal circle; determining a best signal circle for a user mobile device within a predetermined distance of dead zones; and sending the best signal circle to the user mobile device based at least in part on the signal reputation score and a location of the user mobile device.

In Example 2 the subject matter of Example 1 optionally includes wherein each of the plurality of signal reputation data comprises a location, a provider, a network type, and a timestamp.

In Example 3 the subject matter of Example 1 optionally includes further comprising: suspending obtaining the plurality of signal reputation data responsive to while a battery status of the collector device meets a predetermined criteria.

In Example 4 the subject matter of Example 1 optionally includes further comprising confirming signal reputation data accuracy with event data.

In Example 5 the subject matter of Example 1 optionally includes wherein calculating a signal circle comprises: marking representative signal values as a signal circle center; grouping representative signal values within a predetermined distance from the signal circle center into the signal circle; and repeating performance of marking and grouping by lowering the predetermined threshold until all representative signal values are contained within a signal circle.

In Example 6 the subject matter of Example 1 optionally includes further comprising: forming a geo-fence a first predetermined distance away from a dead zone; monitoring proximity of the user mobile device to the geo-fence; and alerting the user mobile device of the dead zone responsive to determining the user mobile device is within a second predetermined distance of the geo-fence.

In Example 7 the subject matter of Example 1 optionally includes wherein determining a best signal circle comprises: discarding signal circles with associated reputation scores less than a predetermined threshold; discarding signal circles outside an appropriate distance from a location of the user mobile device; and selecting a signal circle with a highest associated signal reputation score.

In Example 8 the subject matter of Example 1 optionally includes further comprising: sending supplemental information to the user mobile device, wherein the supplemental information comprises navigation from a location of the user mobile device to the best signal circle and recommendations for user mobile device operation.

In Example 9 the subject matter of Example 1 optionally includes wherein the collector device is a user mobile device.

Example 10 is a method of using signal reputation data, comprising: requesting signal circles and associated signal reputation scores from a signal reputation database, based on a location of a user mobile device; determining signal dead zones among the signal circles based on the associated signal reputation scores; determining a best signal circle of the signal circles within a predetermined distance of the dead zones; and presenting the best signal circle on the user mobile device.

Example 11 is a machine readable medium on which is stored instructions that when executed by a programmable device, cause the programmable device to: obtain a plurality of signal reputation data corresponding to a plurality of locations of a collector device; categorize the plurality of signal reputation data into a plurality of groups; calculate a signal circle based on a representative signal value for each of the plurality of groups; calculate a signal reputation score for each signal circle; determine a best signal circle for a user mobile device within a predetermined distance of dead zones; and send the best signal circle to the user mobile device based at least in part on the signal reputation score and a location of the user mobile device.

In Example 12 the subject matter of Example 11 optionally includes further comprising instructions to: suspend obtaining the plurality of signal reputation data responsive to while a battery status of the collector device meets a predetermined criteria.

In Example 13 the subject matter of Example 11 optionally includes further comprising instructions to: confirm signal reputation data accuracy with event data.

In Example 14 the subject matter of Example 11 optionally includes wherein the instructions to calculate a signal circle further comprise instructions to: mark representative signal values as a signal circle center; group representative signal values within a predetermined distance from the signal circle center into the signal circle; and repeat performance of marking and grouping by lowering the predetermined threshold until all representative signal values are contained within a signal circle.

In Example 15 the subject matter of Example 11 optionally includes further comprising instructions to: form a geo-fence a first predetermined distance away from a dead zone; monitor proximity of the user mobile device to the geo-fence; and alert the user mobile device of the dead zone responsive to determining the user mobile device is within a second predetermined distance of the geo-fence.

In Example 16 the subject matter of Example 11 optionally includes wherein the instructions to determine a best signal circle further comprise instructions to: discard signal circles with associated reputation scores less than a predetermined threshold; discard signal circles outside an appropriate distance from a location of the user mobile device; and select a signal circle with a highest associated signal reputation score.

Example 17 is a collector device, comprising: one or more processors; and a memory coupled to the one or more processors and comprising instructions that when executed by the one or more processors cause the collector device to: obtain a plurality of signal reputation data corresponding to a plurality of locations of the collector device; categorize the plurality of signal reputation data into a plurality of groups; calculate a signal circle based on a representative signal value for each of the plurality of groups; calculate a signal reputation score for each signal circle; determine a best signal circle for a user mobile device within a predetermined distance of dead zones; and send the best signal circle to the user mobile device based at least in part on the signal reputation score and a location of the user mobile device.

In Example 18 the subject matter of Example 17 optionally includes further comprising instructions that when executed by the one or more processors cause the collector device to: suspend obtaining the plurality of signal reputation data responsive to while a battery status of the collector device meets a predetermined criteria.

In Example 19 the subject matter of Example 17 optionally includes wherein the instructions that when executed by the one or more processors cause the collector device to calculate a signal circle further comprise instructions that when executed by the one or more processors cause the collector device to: mark representative signal values as a signal circle center; group representative signal values within a predetermined distance from the signal circle center into the signal circle; and repeat performance of marking and grouping by lowering the predetermined threshold until all representative signal values are contained within a signal circle.

In Example 20 the subject matter of Example 17 optionally includes further comprising instructions that when executed by the one or more processors cause the collector device to: form a geo-fence a first predetermined distance away from a dead zone; monitor proximity of the user mobile device to the geo-fence; and alert the user mobile device of the dead zone responsive to determining the user mobile device is within a second predetermined distance of the geo-fence.

In Example 21 the subject matter of Example 17 optionally includes wherein the instructions that when executed by the one or more processors cause the collector device to determine a best signal circle further comprise instructions that when executed by the one or more processors cause the collector device to: discard signal circles with associated reputation scores less than a predetermined threshold; discard signal circles outside an appropriate distance from a location of the user mobile device; and select a signal circle with a highest associated signal reputation score.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the inventions should therefore be determined with reference to the appended claims, along with the full scope of equivalents to which such claims are entitled.

What is claimed is:

1. A user mobile device comprising:
   at least one memory;
   a user interface;
   machine executable instructions; and
   at least one processor to execute the machine executable instructions to at least:
      determine an intended destination to which a user mobile device is predicted to travel;
      determine that a predicted travel path to the intended destination falls within a boundary of a signal circle that is determined to be a dead zone;
      prefetch a plurality of signal circles within a threshold distance of the travel path;
      caching the prefetched signal circles for access when the user mobile device is in the dead zone;
      determine a selected signal circle for a user mobile device within a predetermined distance of the dead zone based on a time of day, a mode of travel, and a characteristic of a user of the user mobile device; and
      provide an indication to travel to the selected signal circle.

2. The user mobile device of claim 1, wherein a signal reputation data associated with a signal circle comprises a location, a provider, a network type, and a timestamp.

3. The user mobile device of claim 1, wherein the at least one processor is to execute the machine executable instructions to:
   suspend obtaining signal reputation data while a battery status of the user mobile device meets a predetermined criteria.

4. The user mobile device of claim 1, wherein the at least one processor is to execute the machine executable instructions to confirm signal reputation data accuracy with event data.

5. The user mobile device of claim 1, wherein the at least one processor is to execute the machine executable instructions to:
   form a geo-fence a first predetermined distance away from a dead zone;
   monitor proximity of the user mobile device to the geo-fence; and
   present an alert of the dead zone responsive to determining the user mobile device is within a second predetermined distance of the geo-fence.

6. The user mobile device of claim 1, wherein the at least one processor is to execute the machine executable instructions to determine a best signal circle by:
   discarding signal circles with associated reputation scores less than a predetermined threshold;
   discarding signal circles outside an appropriate distance from a location of the user mobile device; and
   selecting a signal circle with a highest associated signal reputation score.

7. The user mobile device of claim 1, wherein the at least one processor is to execute the machine executable instructions to:
   obtain supplemental information comprising navigation information from a location of the user mobile device to the selected signal circle and recommendations for user mobile device operation.

8. A method of collecting signal information, the method comprising:
   determining an intended destination to which a user mobile device is predicted to travel;
   determining that a predicted travel path to the intended destination falls within a boundary of a signal circle that is determined to be a dead zone;
   prefetching a plurality of signal circles within a threshold distance of the travel path;
   caching the prefetched signal circles for access when the user mobile device is in the dead zone;
   determining a selected signal circle for a user mobile device within a predetermined distance of the dead zone based on a time of day, a mode of travel, and a characteristic of a user of the user mobile device; and
   providing an indication to travel to the selected signal circle.

9. The method of claim 8, wherein a signal reputation data associated with a signal circle comprises a location, a provider, a network type, and a timestamp.

10. The method of claim 8, further comprising:
    suspending obtaining signal reputation data while a battery status of the user mobile device meets a predetermined criteria.

11. The method of claim 8, further comprising confirming signal reputation data accuracy with event data.

12. The method of claim 8, further comprising:
    forming a geo-fence a first predetermined distance away from a dead zone;
    monitoring proximity of the user mobile device to the geo-fence; and
    presenting an alert of the dead zone responsive to determining the user mobile device is within a second predetermined distance of the geo-fence.

13. The method of claim 8, wherein determining a best signal circle comprises:
    discarding signal circles with associated reputation scores less than a predetermined threshold;
    discarding signal circles outside an appropriate distance from a location of the user mobile device; and
    selecting a signal circle with a highest associated signal reputation score.

14. The method of claim 8, further comprising:
    obtaining supplemental information comprising navigation information from a location of the user mobile device to the selected signal circle and recommendations for user mobile device operation.

15. A machine readable disk or device storing instructions that when executed by a programmable device, cause the programmable device to at least:
   determine an intended destination to which a user mobile device is predicted to travel;
   determine that a predicted travel path to the intended destination falls within a boundary of a signal circle that is determined to be a dead zone;
   prefetch a plurality of signal circles within a threshold distance of the travel path;
   cache the prefetched signal circles for access when the user mobile device is in the dead zone;
   determine a selected signal circle for a user mobile device within a predetermined distance of the dead zone based on a time of day, a mode of travel, and a characteristic of a user of the user mobile device; and
   provide an indication to travel to the selected signal circle.

16. The machine readable disk or device of claim 15, wherein a signal reputation data associated with a signal circle comprises a location, a provider, a network type, and a timestamp.

17. The machine readable disk or device of claim 15, wherein the instructions, when executed cause the programmable device to:
   suspend obtaining signal reputation data while a battery status of the user mobile device meets a predetermined criteria.

18. The machine readable disk or device of claim 15, wherein the instructions, when executed cause the programmable device to confirm signal reputation data accuracy with event data.

19. The machine readable disk or device of claim 15, wherein the instructions, when executed cause the programmable device to:
   form a geo-fence a first predetermined distance away from a dead zone;
   monitor proximity of the user mobile device to the geo-fence; and
   present an alert of the dead zone responsive to determining the user mobile device is within a second predetermined distance of the geo-fence.

20. The machine readable disk or device of claim 15, wherein the instructions, when executed cause the programmable device to determine a best signal circle by:
   discarding signal circles with associated reputation scores less than a predetermined threshold;
   discarding signal circles outside an appropriate distance from a location of the user mobile device; and
   selecting a signal circle with a highest associated signal reputation score.

21. The machine readable disk or device of claim 15, wherein the instructions, when executed cause the programmable device to:
   obtain supplemental information comprising navigation information from a location of the user mobile device to the selected signal circle and recommendations for user mobile device operation.

* * * * *